US009345248B2

(12) United States Patent
Greve

(10) Patent No.: US 9,345,248 B2
(45) Date of Patent: May 24, 2016

(54) PEELING APPARATUS WITH LONG-LIFE FINGER-FRAME CAM ROLLERS

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 96 days.

(21) Appl. No.: 14/464,941

(22) Filed: Aug. 21, 2014

(65) Prior Publication Data
US 2016/0050944 A1 Feb. 25, 2016

(51) Int. Cl.
A22C 29/02 (2006.01)

(52) U.S. Cl.
CPC ..................... *A22C 29/026* (2013.01)

(58) Field of Classification Search
CPC ...... A22C 29/00; A22C 29/02; A22C 29/021; A22C 29/023; A22C 29/024; A22C 29/026
USPC .................. 452/1, 2, 5, 7, 9, 12, 19
See application file for complete search history.

(56) References Cited

U.S. PATENT DOCUMENTS

| | | | |
|---|---|---|---|
| 2,778,055 A | 1/1957 | Lapeyre et al. | |
| 3,740,795 A * | 6/1973 | Cox | A22C 29/026 452/5 |
| 4,947,519 A * | 8/1990 | Griffis | A22C 29/043 452/19 |
| 5,005,258 A * | 4/1991 | Griffis | A22C 29/043 452/18 |
| 5,120,265 A * | 6/1992 | Ledet | A22C 29/026 452/2 |
| 5,980,373 A * | 11/1999 | Rosow | A22C 29/026 452/2 |
| 6,017,268 A * | 1/2000 | Rosow | A22C 29/026 452/5 |
| 6,139,415 A * | 10/2000 | Rosow | A22C 29/026 452/5 |
| 6,248,010 B1 * | 6/2001 | Sirgo | A22C 29/026 452/5 |
| 6,435,959 B1 * | 8/2002 | Skrmetta | A22C 29/00 452/5 |
| 7,811,157 B1 * | 10/2010 | Wimberly, Jr. | A22C 29/026 452/5 |
| 8,616,940 B2 * | 12/2013 | Vedsted | A22B 5/166 452/5 |
| 8,870,632 B2 * | 10/2014 | Vedsted | A22B 5/166 452/5 |

* cited by examiner

*Primary Examiner* — Richard Price, Jr.
(74) *Attorney, Agent, or Firm* — James T. Cronvich

(57) ABSTRACT

Peeling apparatus and cam followers for lowering and raising the finger frames of roller-type peeling apparatus. The cam followers have monolithic hardened stainless steel cam rollers with journals extending outward of central wheels into bronze bushings retained stationarily in holders. The monolithic cam rollers roll on pivoting cams at the four corners of the finger frame to raise and lower the finger frame in synchrony with the back and forth rotation of peeling rollers forming peeling channels. Support rollers supporting the ends of the peeling rollers also rotate in stationary bronze bushings.

17 Claims, 5 Drawing Sheets

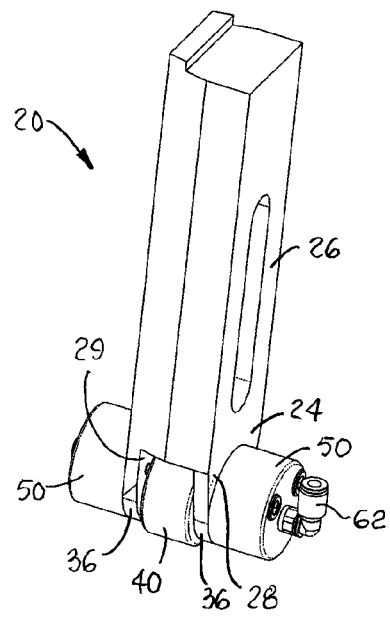
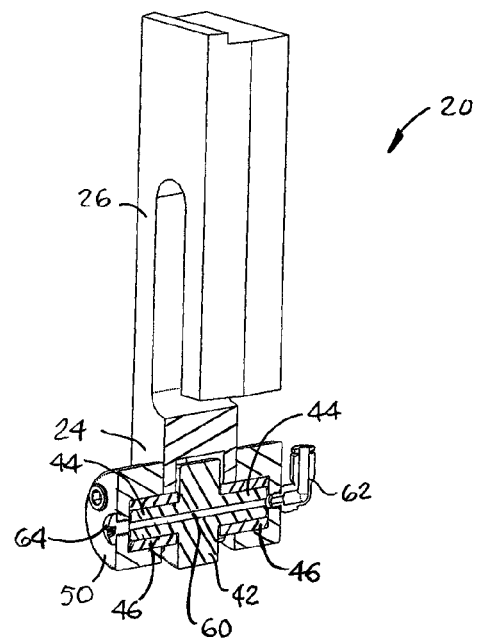
FIG. 5A    FIG. 5B
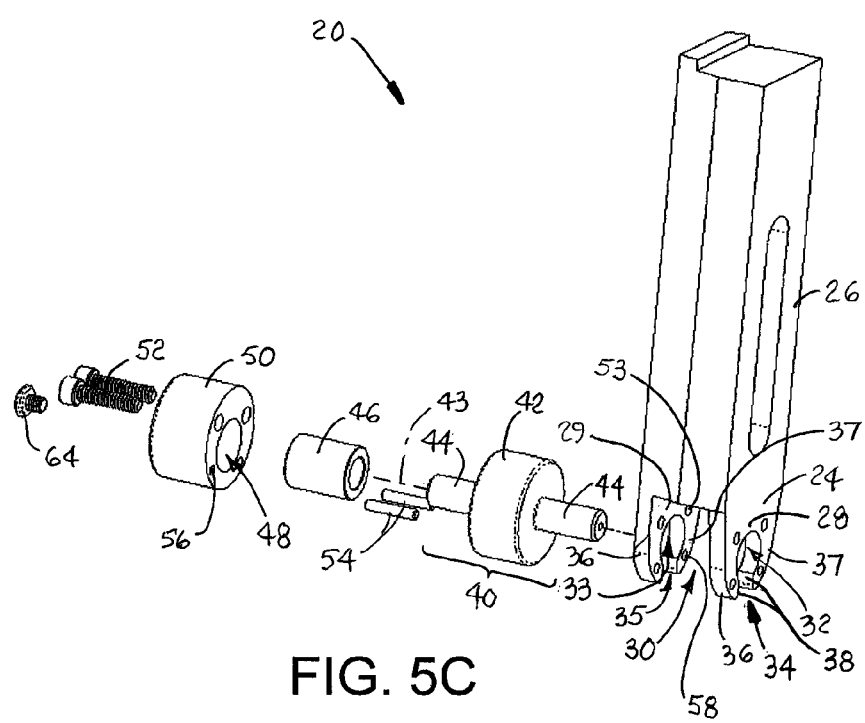
FIG. 5C

PEELING APPARATUS WITH LONG-LIFE FINGER-FRAME CAM ROLLERS

BACKGROUND

The invention relates to a bulk-peeling apparatus and more particularly to roller-type shrimp-peeling machinery.

Originally introduced because of the high labor costs of peeling small shrimp by hand, shrimp-peeling machines are now widely used by shrimp processors. Roller-type peeling machines, in particular, dominate the bulk shrimp-peeling industry. U.S. Pat. No. 2,778,055, Jan. 22, 1957, and U.S. Pat. No. 2,537,355, Jan. 9, 1951, both to Lapeyre et al., describe the basic structure and principles of operation of roller-type shrimp peelers.

Roller-type peeling machines are constructed of parallel peeling channels formed by lower power rollers flanked slightly higher by channel-forming rollers. The channels decline from an infeed end to an outfeed end. The rollers rotate back and forth to loosen shrimp shells in peeling nips between adjacent peeling rollers and to move the shrimp back and forth across the channels to present different orientations of the shrimp to the peeling nips. A finger frame above the peeling channels includes an array of pressure fingers. The finger frame is raised and lowered in synchrony with the back and forth rotation of the peeling rollers. When lowered, the fingers push the shrimp into the peeling nips. When raised, the fingers allow the shrimp to advance along the declining peeling channels. The finger frame is raised and lowered by cams on the peeler frame at the corners of the finger frame. The cams are tilted back and forth. Cam followers attached to the finger frame ride on the reciprocating cams. The conventional cam followers 110, as shown in FIG. 8, consist of a holder 112 with a pair of ears 114 forming a stanchion at a bottom end of the holder. A roller 116 is mounted 118 between the two ears 114 on a hollow bolt. The bolt 118 is supported in aligned holes 120 through the ears 114. The roller 116 has a relatively thin hardened steel outer shell 122 rotationally attached to a ball-bearing hub 124. The hub is stationarily affixed to the bolt 118 so that it does not rotate. The outer shell 122 rotates on the bearing 124. A nut 126 and washers 127 are used to affix the bolt 118 to the ears 114. A lubricant fitting 128 permits lubricant to be added to the bearing 124 through the hollow bolt 118 and an opening 130 in its shaft.

One of the problems with the cam follower shown in FIG. 8 is that the roller 116 is susceptible to cracking, especially when the finger frame, which is hinged to allow it to be tilted up for servicing, is dropped back into position after servicing. The hard, thin outer shell 122 transmits impacts to the ball bearings. The impacts can deform the balls, the bearing race, and the outer shell. Once the bearing starts to fail, the roller starts to slide along the cam rather than roll along it. The sliding wears a groove in the cam, which affects the position of the finger frame relative to the peeling rollers. Often, the roller shell 122 cracks. In both situations peeling performance is compromised, and replacement of the cam rollers and, sometimes, the cams as well, is required.

SUMMARY

One version of peeling apparatus embodying features of the invention comprises a peeling rollers mounted in a peeler frame and extending in parallel to form peeling channels between adjacent peeling rollers. A finger frame has pressure fingers extending into the peeling channels. A drive system rotates the peeling rollers back and forth and rocks cams attached to the peeler frame back and forth in synchrony with the rotation of the peeling rollers. Cam followers attached to the finger frame each have a cam roller that rides on one of the cams to lower and raise the finger frame and the pressure fingers in synchrony with the rotation of the peeler rollers. Each of the cam followers further includes a holder having first and second holes aligned and spaced apart across a gap at a first end of the holder, a first bushing received stationarily in the first hole, and a second bushing received stationarily in the second hole. A cam roller includes a central wheel, a first journal extending outward from a first side of the wheel and through the first bushing, and a second journal extending outward from an opposite second side of the wheel and through the second bushing. The first and second bushings form bearing sleeves for the first and second journals as they rotate when the cam roller rolls on one of the cams. The first and second bushings are made bronze and the first and second journals are made of a second material harder than bronze.

In another aspect of the invention, a cam follower embodying features of the invention for lowering and raising the finger frame of roller-type peeling apparatus comprises a holder attachable to the finger frame of roller-type peeling apparatus and having a pair of aligned holes at a first end of the holder. A pair of stationary tubular bushings line the holes. A monolithic cam roller has a central wheel and a pair of aligned journals that extend from opposite sides of the central wheel. The journals are rotatably received in the stationary tubular bushings define an axis of rotation of the cam roller through the aligned holes. The cam roller is adapted to roll on a cam in the peeling apparatus to lower and raise the finger frame.

Another version of such a cam follower comprises a holder attachable to the finger frame of roller-type peeling apparatus. The holder has first and second holes aligned and spaced apart across a gap at a first end of the holder. A first bushing is received stationarily in the first hole, and a second bushing is received stationarily in the second hole. A cam roller includes a central wheel, a first journal extending outward from a first side of the wheel and through the first bushing, and a second journal extending outward from an opposite second side of the wheel and through the second bushing. The first and second bushings form bearing sleeves for the first and second journals as they rotate when the cam roller rolls on a cam in the roller-type peeling apparatus. The first and second tubular bushings are made of a first material, and the first and second journals are made of a second material harder than the first material.

BRIEF DESCRIPTION OF THE DRAWINGS

These features and aspects of the invention are described in more detail in the following description, appended claims, and accompanying drawings, in which:

FIGS. 5A-5C are axonometric, cross-sectional, and exploded views of a cam follower usable in a peeling machine as in FIG. 1;

DETAILED DESCRIPTION

Figure 1:
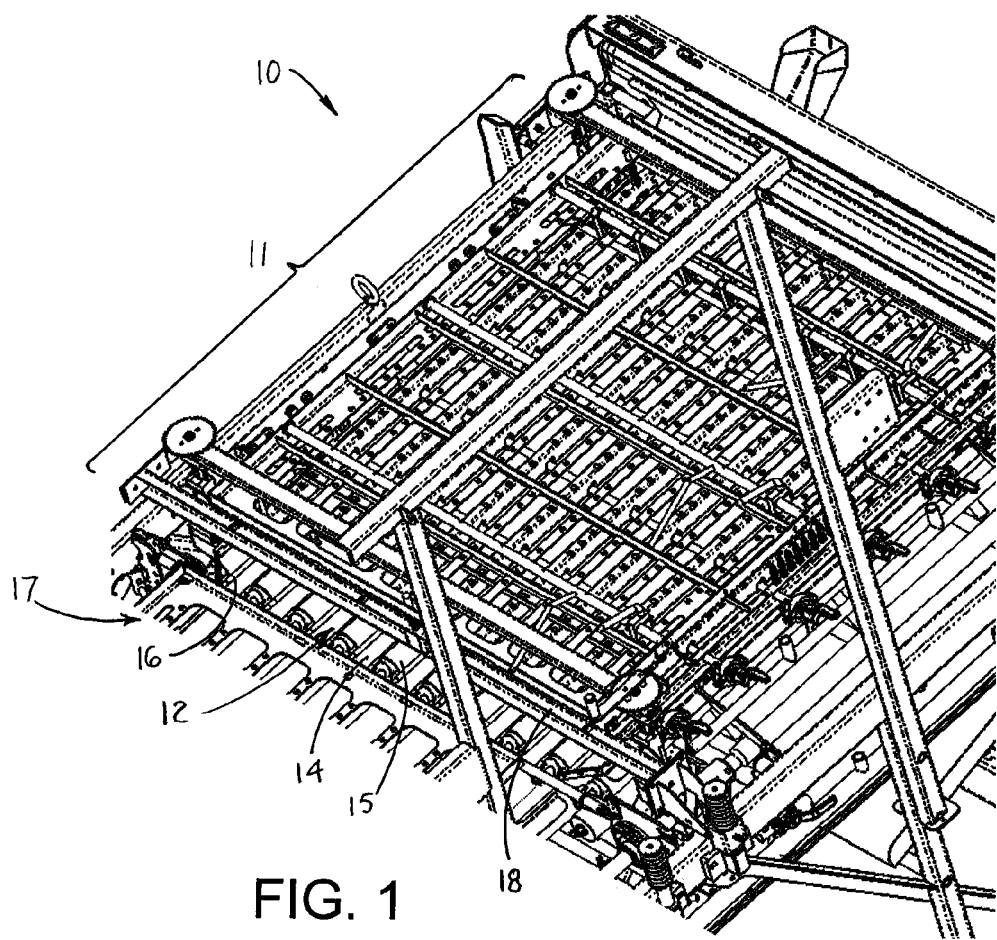
FIG. 1 is an axonometric view of a portion of the upper peeling section of a roller-type peeling machine embodying features of the invention.

A portion of the upper peeling section of peeling apparatus embodying features of the invention is shown in FIG. 1. The upper peeling section 11 of the peeler 10 has an array of parallel peeling channels 12 formed by power rollers 14 flanked on both sides by channel-forming rollers 15 elevated slightly above the power rollers. The peeling channels 12 decline downward from an upper infeed end of the peeler. Both sets of rollers 14, 15 are powered by gears at the infeed end that rotate the rollers back and forth. Narrow stainless steel insert rollers 16 are held in the narrow gaps between the power rollers 14 and the channel-forming rollers 15 in the upper peeling section 11. The power rollers 14 extend into the lower peeling section 17 and sit laterally offset from and atop lower rollers (not shown). The upper channel-forming rollers 15 do not extend into the lower peeling section 17. The peeling channels formed by the power rollers 14 and the lower rollers in the lower peeling section do not have insert rollers 16. The lower, power, and channel-forming rollers are all referred to as peeling rollers in this application.

Both the upper peeling section 11 and the lower peeling section 17 in this example have a finger frame 18 that is driven up and down in synchrony with the rotation of the peeling rollers 14, 15. The up-and-down rotation of the finger frame 18 raises and lowers an array of pressure fingers 19 (FIG. 2) that push shrimp into peeling nips formed in the channels 12 between the inserts 16 and the peeling rollers 14, 15, and then release pressure on the shrimp so that they can advance down and across the peeling channels. The finger frame for the lower peeling section 17 operates in a similar way by alternately urging shrimp into peeling nips formed between the power and lower rollers and then releasing pressure on the shrimp. Further details of the roller-type peeling machine 10 are given in U.S. Pat. No. 2,778,055, which is entirely incorporated into this description by reference.

Figure 2:
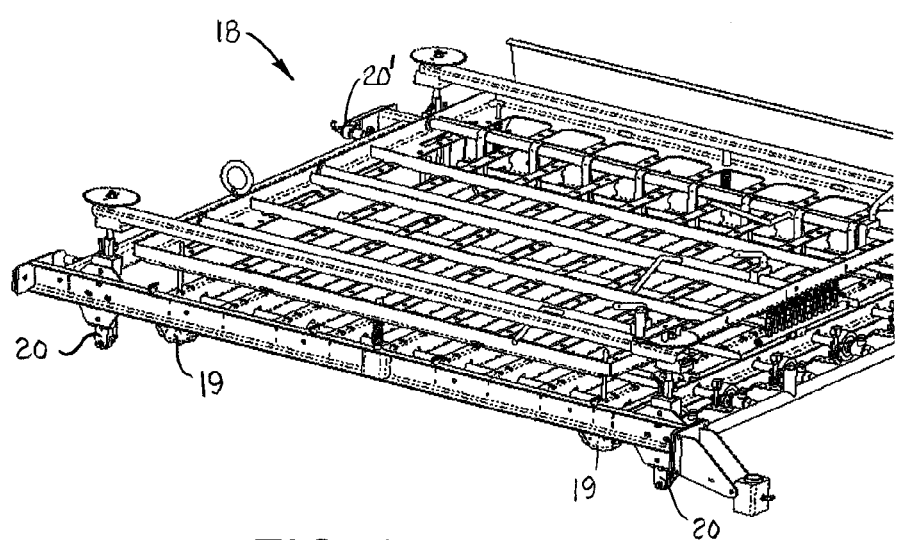
FIG. 2 is an axonometric view of a finger frame usable in a peeling machine as in FIG. 1.

The finger frame 18 is shown in FIG. 2. Only a few of the pressure fingers 19 are shown to simplify the drawing. The pressure fingers 19 are shaped to conform generally to the cross-sectional shape of the peeling channels. Cam followers 20 are affixed to the finger frame at each of its four corners. The cam followers at the upper two corners are not shown in FIG. 2. The four cam followers extend downward below the level of the fingers 19 and outside the outermost peeling rollers. A fifth cam follower 20' is affixed to an upper portion of the finger frame 18 and extends parallel to the peeling rollers and perpendicular to the corner cam followers 20.

Figure 3:
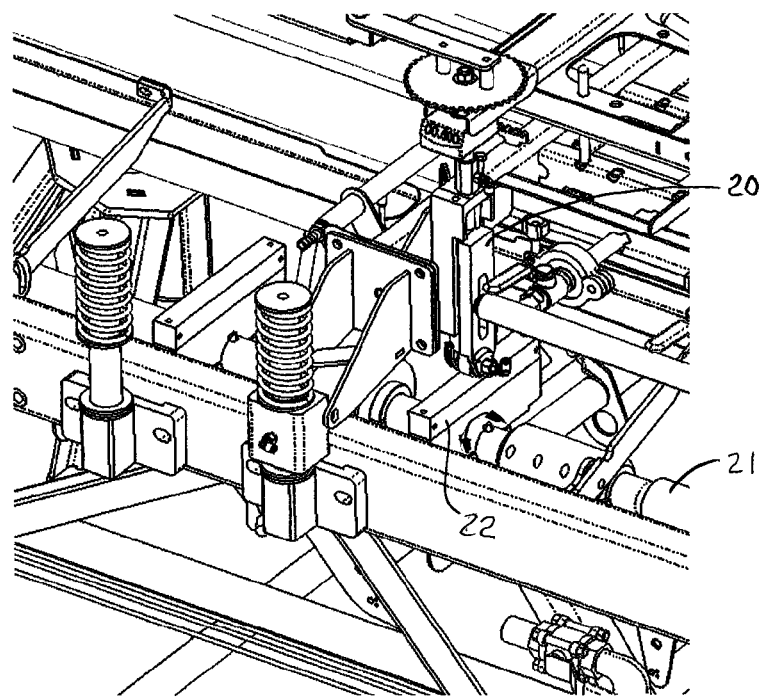
FIG. 3 is an enlarged view of a portion of the peeling machine of FIG. 1 showing cams and cam followers for raising and lowering the finger frame.
Figure 4:
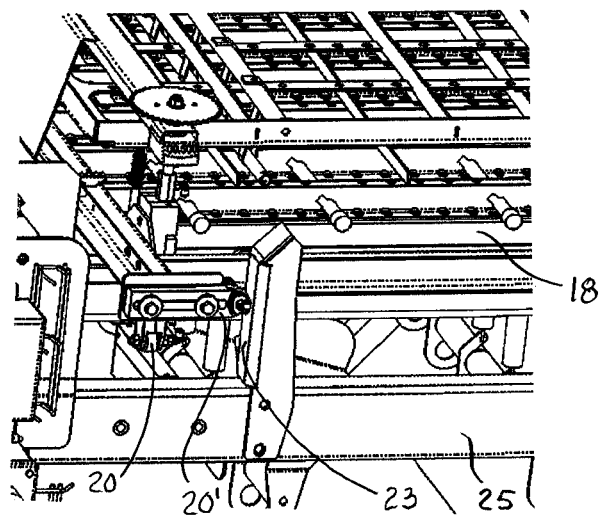
FIG. 4 is an axonometric view of an upper end of the peeling machine of FIG. 1 showing a vertical cam and cam follower for preventing the finger frame from wandering as it is raised and lowered.

As shown in FIG. 3, the downwardly extending cam followers 20 at each corner ride on a cam 22 that is pivoted back and forth by a reciprocating cam shaft 24 driven by the peeler's drive motor. Besides the cam shafts 21 on each side of the peeling channels, the motor drives rack gears that engage pinion gears on the power and channel-forming rollers to rotate them back and forth. The cam shafts, rack gears, and motor are part of a drive system that rotates the peeling rollers in synchrony with the raising and lowering of the finger frames for both the upper and lower peeling sections. As the cams 22 pivot back and forth, the cam followers 20 at the corners move up and down to raise and lower the finger frame 18. As shown in FIG. 4, the cam follower 20' at the upper corner rides up and down along a stationary flat surface 23 affixed to the peeler frame 25 to maintain the finger frame 18 in position as it moves up and down.

The cam followers 20 are shown in greater detail in FIGS. 5A-5C. Each cam follower 20 has a holder 24 at one end of a shank 26. The holder 24 has two depending arms 28, 29 separated across a gap 30. The arms 28, 29 have aligned holes 32, 33 through them. Slots 34, 35 form an access opening into the holes 32, 33. Cam fingers 36, 37 on each arm 28, 29 bound the holes 32, 33 and the slots 34, 35. Opposing finger tips 38 on each pair of fingers define the width of the slots 34, 35 that open into the holes 32, 33. The width of the slots 34, 35 is less than the diameter of the holes 32, 33.

The cam follower's holder 24 retains a cam roller 40 that includes a central wheel 42 and a pair of aligned shafts or journals 44 extending outward from the center of the sides of the wheel. The journals 44 define the axis of rotation 43 of the cam roller 40. The cam roller 40 is monolithically formed out of a hard material such as a hardened stainless steel. Bronze bushings 46 on each side of the gap 30 line the holes 32, 33 in the holder. The bronze bushings 46 remain stationary in the holes 32, 33 and serve as bearings for the cam roller 40 as the journals 44 rotate in the bushings. The bronze bushings 46 are durable bearings, but deform from frictional contact with the rotating journals 44 made of the harder stainless steel. But as the bronze bushings 46 deform with use, they conform to the journals 44 and provide a broad contact area that distributes the force of the journals over that broad area.

The central wheel 42 of the cam roller 40 is received in the gap 30 between the two arms 28, 29 of the holder 24. The two journals are received in the tubular bushings 46 that line the holes 32, 33 in the arms. The journals 44 of the cam roller 40 are inserted into the bushings 46, and that assembly snapped in place in the holes 32, 33 through the slots 34, 35. The width of the restricted opening of the slots is less than the diameter of the bushings. The fingers 36, 37 on each arm 28, 29 are able to move apart slightly from their relaxed positions as the cam-roller-bushing assembly is pushed into position through the slots. Once the cam-roller-bushing assembly is positioned in place in the holes, the fingers 36, 37 return to their relaxed positions. The two arms 28, 29 form a yoke that supports the cam rollers 40 rotatably in the bronze bushings 46. The central wheel 42 rides on the peeling frame's cam.

The bushings 46 extend outward of the holes 32, 33 in the holder 24 into blind holes 48 formed in end caps 50. The end caps, made of brass, for example, support the outer ends of the bushings 46 in the journals 44. Bolts 52 through the end caps 50 are received in threaded holes 53 in the arms 28, 29 of the holder 24. Dowels 54 extend from holes 56 in the end caps into holes 58 in the arms 28, 29. The monolithic cam roller 40 is cruciform in a cross-section through its axis (as best shown in FIG. 5B) and has an axial passageway 60 to admit lubricant into the bearing through a fitting 62 in one of the end caps 50. In the other identical end cap, a plug 64 replaces the lubricant fitting 62. The same cam follower design may be used for the retaining cam follower 20' that rides on the stationary surface 23 shown in FIG. 4.

Figure 6:
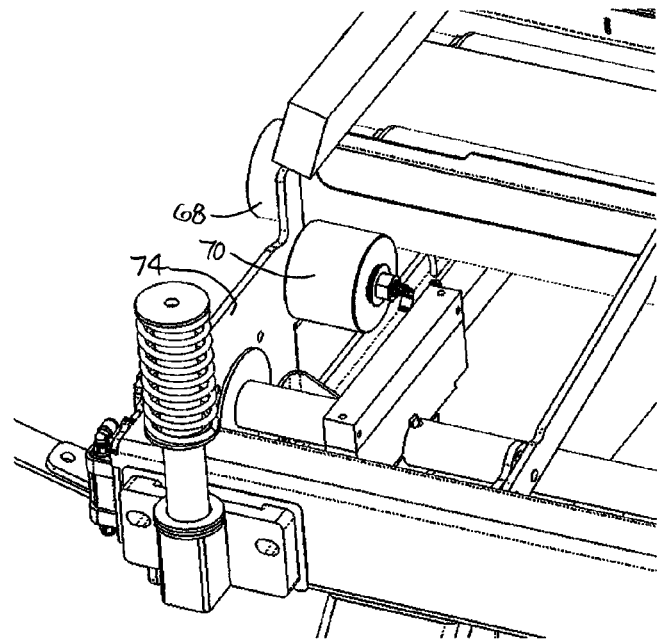
FIG. 6 is an enlarged view of the peeling machine of FIG. 1 showing a support roller for a peeling roller.
Figure 7A:
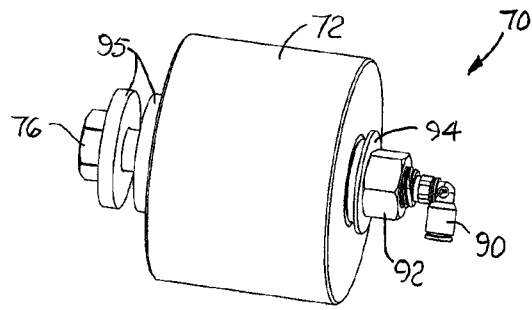
FIGS. 7A and 7B are axonometric and exploded views of the support roller of FIG. 6.
Figure 7B:
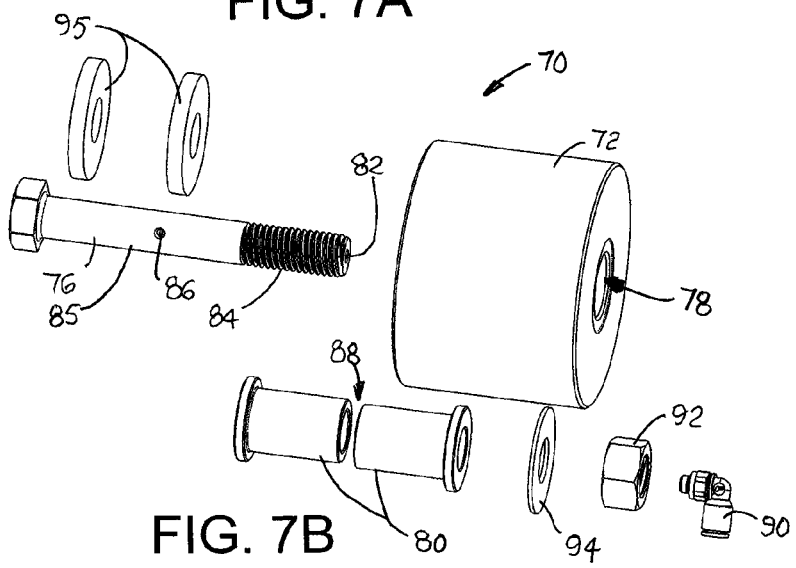
Figure 8:
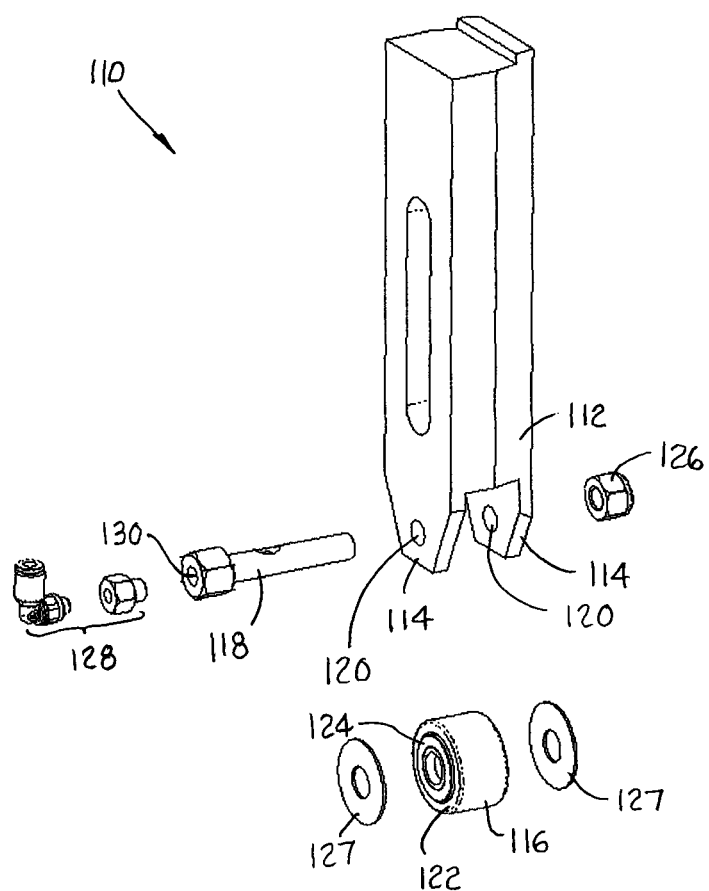
FIG. 8 is an exploded view of a conventional cam follower for a peeling machine.

While the finger frames are supported on the cam rollers, the outermost peeling rollers 68 and the upper and lower peeling sections are supported by short support rollers 70 at the lower ends of those sections, as shown in FIG. 6. As shown in FIGS. 7A and 7B, the support roller 70 includes a wheel 72 that is attached to the peeler frame 74 (FIG. 6) by a mounting bolt 76 that extends through an axial bore 78 in the wheel. A bronze bushing 80—in this example, a two-piece flanged bushing—is received in the wheel's bore 78. The mounting bolt is pressed tightly into the bushings 80 so that the bushings remain stationary on the bolt 76 as the wheel 72 rotates. The bolt 76 has a lubricant passageway 82 from a threaded end 84 that opens onto an unthreaded portion 85 of the bolt's shaft through a hole 86. When the bolt 76 is in place in the bushings 80, the hole 86 supplies lubricant to the bearing area between the bushings 80 and the unthreaded portion of the bolt through a space 88 between the two bushings. A lubricant fitting 90 screws into the threaded end of the bolt's passageway 82. The wheel 72 is retained on the mounting bolt 76 by a nut 92 and washers 94, 95. The wheel 72 is thus able to freely rotate on the stationary bronze bushings 80 to support the ends of the outermost peeling rollers in low-friction rolling contact. So, like the cam rollers, the support rollers 70 bear on stationary bronze bushings.

What is claimed is:

1. Peeling apparatus comprising:
    a peeler frame;
    a plurality of peeling rollers mounted in the peeler frame and extending in parallel to form peeling channels between adjacent peeling rollers;
    a finger frame having a plurality of pressure fingers extending into the peeling channels;
    a plurality of cams attached to the peeler frame;
    a drive system for rotating the peeling rollers back and forth and rocking the cams back and forth in synchrony with the rotation of the peeling rollers;
    a plurality of cam followers attached to the finger frame, each of the cam followers having a cam roller that rides on one of the cams to lower and raise the finger frame and the pressure fingers in synchrony with the rotation of the peeler rollers;
    wherein each of the cam followers further includes:
        a holder having first and second holes aligned and spaced apart across a gap at a first end of the holder;
        a first bushing received stationarily in the first hole, and a second bushing received stationarily in the second hole;
        a cam roller including a central wheel, a first journal extending outward from a first side of the wheel and through the first bushing, and a second journal extending outward from an opposite second side of the wheel and through the second bushing, wherein the first and second bushings form bearing sleeves for the first and second journals as they rotate when the cam roller rolls on one of the cams; and
        wherein the first and second bushings are made bronze and the first and second journals are made of a second material harder than bronze.

2. Peeling apparatus as in claim 1 further comprising a plurality of support rollers attached to the frame to support the ends of the outermost peeling rollers, wherein each of the support rollers includes:
    a mounting bolt attached to the frame near an end of one of the outermost peeling rollers;
    a tubular bronze bushing having a central bore stationarily receiving the mounting bolt;
    a wheel having a central bore receiving the bolt and the tubular bronze bushing for the wheel to rotate freely on the tubular bronze bushing with the rotation of the outermost peeling roller.

3. Peeling apparatus as in claim 1 wherein the central wheel, the first journal, and the second journal are monolithically formed of a hardened stainless steel.

4. A cam follower for lowering and raising the finger frame of roller-type peeling apparatus, comprising:
    a holder attachable to the finger frame of roller-type peeling apparatus and having a pair of aligned holes at a first end of the holder;
    a pair of stationary tubular bushings lining the holes;
    a monolithic cam roller having a central wheel and a pair of aligned journals extending from opposite sides of the central wheel and rotatably received in the stationary tubular bushings to define an axis of rotation of the cam roller through the aligned holes, wherein the cam roller is adapted to roll on a cam in the peeling apparatus to lower and raise the finger frame.

5. A cam follower as in claim 4 wherein the bushings are made of a first material and the monolithic cam roller is made of a second material harder than the first material.

6. A cam follower as in claim 4 wherein the cam roller has a central passageway extending axially through the pair of journals and the central wheel and opening onto the ends of the pair of journals for lubricant to pass through the cam roller.

7. A cam follower as in claim 4 further comprising a pair of end caps fastened to and flanking the end of the holder, each of the end caps having a blind hole sized to receive and support one of the bushings and the journal received in that bushing.

8. A cam follower as in claim 7 wherein at least one of the end caps has a lubricant passage extending from an outer side of the end cap and into the blind hole to admit lubricant.

9. A cam follower as in claim 4 wherein the holder includes a yoke at the first end, the yoke having a pair of slots, wherein each slots opens into one of the holes to allow the tubular bushings and the monolithic cam roller to be inserted into the holes through the slots.

10. A cam follower as in claim 4 wherein the holder includes a yoke at the first end having a first arm and a second arm spaced apart across a gap, wherein the first and second arms each have a pair of fingers bounding one of the aligned holes and having finger tips at the first end of the holder, wherein the finger tips define a slot between them that opens into the hole.

11. A cam follower as in claim 10 wherein the width of the slots is less than the diameter of the holes to allow the bushings to be snapped in place through the slots and into the holes.

12. A cam follower as in claim 10 wherein the central wheel is received in the gap between the first and second arms.

13. A cam follower as in claim 5 wherein the first material is bronze and the second material is a hardened stainless steel.

14. A cam follower for lowering and raising the finger frame of roller-type peeling apparatus, comprising:
    a holder attachable to the finger frame of roller-type peeling apparatus and having first and second holes aligned and spaced apart across a gap at a first end of the holder;
    a first bushing received stationarily in the first hole, and a second bushing received stationarily in the second hole;
    a cam roller including a central wheel, a first journal extending outward from a first side of the wheel and through the first bushing, and a second journal extending outward from an opposite second side of the wheel and through the second bushing, wherein the first and second bushings form bearing sleeves for the first and second journals as they rotate when the cam roller rolls on a cam in the roller-type peeling apparatus; and
    wherein the first and second tubular bushings are made of a first material, and the first and second journals are made of a second material harder than the first material.

15. A cam follower as in claim 14 wherein the first material is bronze and the second material is a hardened stainless steel.

16. A cam follower as in claim 14 wherein the central wheel, the first journal, and the second journal are monolithically formed of the first material.

17. A cam follower as in claim 14 further comprising first and second end caps fastened to and flanking the first end of the holder, the first end cap having a blind hole sized to receive and support the first bushing and the first journal and second end cap having a blind hole sized to receive and support the second bushing and the second journal.

\* \* \* \* \*